(12) United States Patent
Cakulev et al.

(10) Patent No.: US 12,160,490 B2
(45) Date of Patent: Dec. 3, 2024

(54) METHOD AND SYSTEM FOR POLICY CONTROL FUNCTION DISCOVERY SERVICE

(71) Applicant: Verizon Patent and Licensing Inc., Basking Ridge, NJ (US)

(72) Inventors: Violeta Cakulev, Millburn, NJ (US); Sudhakar Reddy Patil, Flower Mound, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/891,585

(22) Filed: Jun. 3, 2020

(65) Prior Publication Data

US 2021/0385302 A1 Dec. 9, 2021

(51) Int. Cl.
  *G06F 15/16* (2006.01)
  *H04L 67/02* (2022.01)
  *H04L 69/00* (2022.01)

(52) U.S. Cl.
  CPC .............. *H04L 69/03* (2013.01); *H04L 67/02* (2013.01)

(58) Field of Classification Search
  CPC ..... H04L 69/03; H04L 67/02; H04L 12/1407; H04L 67/51; H04L 67/14; H04L 41/0894; H04L 65/1073; H04L 65/1066
  See application file for complete search history.

(56) References Cited

U.S. PATENT DOCUMENTS

| | | | |
|---|---|---|---|
| 11,178,592 B2* | 11/2021 | Talebi Fard | H04W 40/246 |
| 11,412,556 B2* | 8/2022 | Dao | H04W 76/10 |
| 2012/0314632 A1* | 12/2012 | Martinez De La Cruz | H04L 65/1069 370/310 |
| 2018/0199398 A1* | 7/2018 | Dao | H04W 76/34 |
| 2018/0270778 A1* | 9/2018 | Bharatia | H04L 65/1073 |
| 2018/0352050 A1* | 12/2018 | Li | H04L 67/5682 |
| 2019/0075107 A1* | 3/2019 | Chiaverini | H04L 67/141 |
| 2019/0158408 A1* | 5/2019 | Li | H04W 72/56 |
| 2019/0207778 A1* | 7/2019 | Qiao | H04W 76/10 |
| 2019/0260834 A1* | 8/2019 | Thiebaut | H04L 61/50 |
| 2019/0357301 A1* | 11/2019 | Li | H04W 80/10 |
| 2020/0028920 A1* | 1/2020 | Livanos | H04W 8/26 |
| 2020/0092424 A1* | 3/2020 | Qiao | H04L 12/1407 |
| 2020/0214054 A1* | 7/2020 | Qiao | H04L 47/824 |

(Continued)

FOREIGN PATENT DOCUMENTS

WO  WO-2020057488 A1 *  3/2020  ............ H04W 24/04

OTHER PUBLICATIONS

"3rd Generation Partnership Project; Technical Specification Group Core Network and Terminals; 5G System; Binding Support Management Service; Stage 3 (Release 16)", 3GPP TS 29.521 V16.3.0 (Mar. 2020).

*Primary Examiner* — Suraj M Joshi
*Assistant Examiner* — Hao H Nguyen

(57) ABSTRACT

A method, a system, and a non-transitory storage medium are described in which an discovery service is provided. The discovery service may provide a network device to request for binding information from a binding service function. The request may include information that indicates a type of policy control function. For example, the information may indicate a session management policy control function, an access management policy control function, or another dedicated type of policy control function.

20 Claims, 6 Drawing Sheets

(56) References Cited

U.S. PATENT DOCUMENTS

| | | | |
|---|---|---|---|
| 2020/0221541 A1* | 7/2020 | Yan | H04W 48/16 |
| 2020/0280562 A1* | 9/2020 | Salkintzis | H04L 65/612 |
| 2020/0322775 A1* | 10/2020 | Lee | H04W 8/02 |
| 2020/0322821 A1* | 10/2020 | Lee | H04L 65/1016 |
| 2020/0323029 A1* | 10/2020 | Lu | H04W 76/25 |
| 2020/0383043 A1* | 12/2020 | Wei | H04W 28/24 |
| 2020/0396678 A1* | 12/2020 | Lee | H04W 48/18 |
| 2020/0413466 A1* | 12/2020 | Yu | H04W 76/16 |
| 2021/0007166 A1* | 1/2021 | Liao | H04W 48/16 |
| 2021/0037375 A1* | 2/2021 | Cakulev | H04M 15/66 |
| 2021/0058366 A1* | 2/2021 | Mas Rosique | H04W 4/24 |
| 2021/0136674 A1* | 5/2021 | Lee | H04L 41/5009 |
| 2021/0227614 A1* | 7/2021 | Sun | H04M 15/66 |
| 2021/0258861 A1* | 8/2021 | Wang | H04W 48/14 |
| 2021/0289390 A1* | 9/2021 | Zhou | H04W 28/0933 |
| 2021/0321251 A1* | 10/2021 | Colom Ikuno | H04L 12/1407 |
| 2021/0321466 A1* | 10/2021 | Colom Ikuno | H04W 76/10 |
| 2022/0022101 A1* | 1/2022 | Wang | H04M 15/8228 |
| 2022/0030495 A1* | 1/2022 | Qiao | H04W 24/04 |
| 2022/0070702 A1* | 3/2022 | Puente Pestaña | H04L 43/065 |
| 2022/0095260 A1* | 3/2022 | Shan | H04W 60/04 |
| 2022/0104118 A1* | 3/2022 | Ding | H04W 48/18 |
| 2022/0110023 A1* | 4/2022 | Wu | H04W 28/16 |
| 2022/0150683 A1* | 5/2022 | Zhou | H04W 60/00 |
| 2022/0151004 A1* | 5/2022 | Sedlacek | H04W 8/082 |
| 2022/0159446 A1* | 5/2022 | Zhou | H04W 4/50 |
| 2022/0191650 A1* | 6/2022 | Kim | H04L 67/10 |
| 2022/0191776 A1* | 6/2022 | Kim | H04L 67/306 |
| 2022/0201085 A1* | 6/2022 | Hu | H04L 67/146 |
| 2022/0201543 A1* | 6/2022 | Zhu | H04W 28/0925 |
| 2022/0225197 A1* | 7/2022 | Yang | H04W 48/10 |
| 2022/0225443 A1* | 7/2022 | Zhu | H04L 67/1044 |
| 2022/0240173 A1* | 7/2022 | Wang | H04W 40/248 |
| 2023/0047783 A1* | 2/2023 | Zong | H04W 4/50 |
| 2023/0061152 A1* | 3/2023 | Sun | H04W 60/00 |
| 2023/0079126 A1* | 3/2023 | Mas Rosique | H04W 48/17 709/245 |
| 2023/0143200 A1* | 5/2023 | Kweon | H04L 41/5051 709/223 |

* cited by examiner

METHOD AND SYSTEM FOR POLICY CONTROL FUNCTION DISCOVERY SERVICE

BACKGROUND

Development and design of radio access networks (RANs), core networks, and application service networks, present certain challenges from a network-side perspective and an end device perspective. For example, depending on the configurations from both network-side and end device-side perspectives, such configurations may impact various performance metrics, such as accessibility, congestion, latency, throughput, etc. Accordingly, a need exists to overcome these challenges.

DETAILED DESCRIPTION OF PREFERRED EMBODIMENTS

Figure 1:
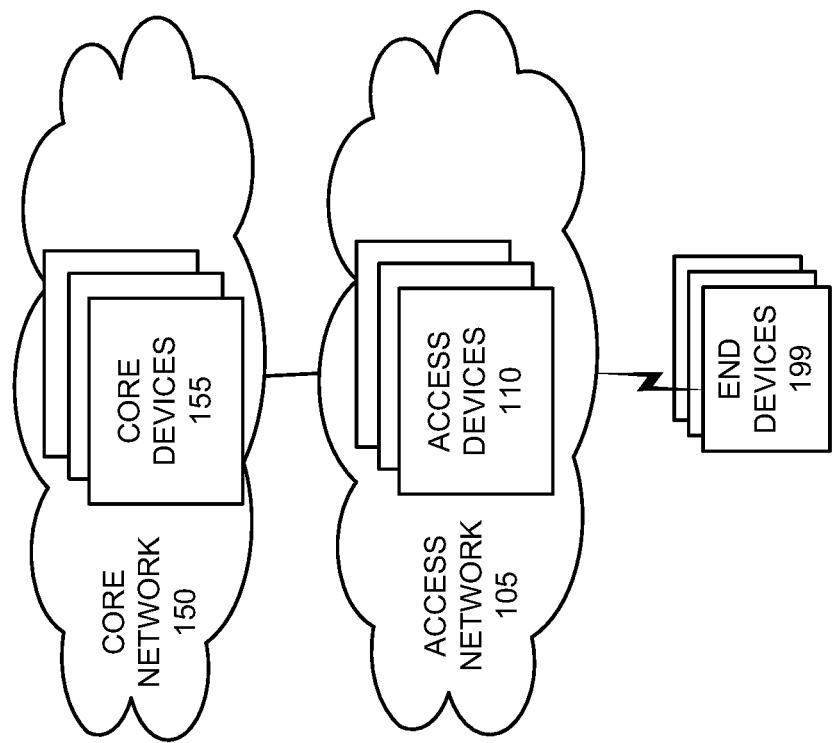
FIG. 1 is a diagram illustrating an exemplary environment in which an exemplary embodiment of an discovery service may be implemented.

The following detailed description refers to the accompanying drawings. The same reference numbers in different drawings may identify the same or similar elements. Also, the following detailed description does not limit the invention.

In a Fifth Generation (5G) core (5GC) network or another type of network, a policy control function (PCF) or another type of policy control network device may provide various types of policies to another network device, network element, or (physical or virtual) network function (referred to herein as "network device"). For example, the PCF may provide packet data unit (PDU) session management policy control policies to a session management function (SMF) and access and mobility-related policy control information to an access and mobility management function (AMF). The PCF may also provide PDU session related policies to end devices (e.g., user equipment (UE)).

A binding service function (BSF) may assist the AMF and the SMF to obtain access management (AM) policies, session management (SM) policies, and user equipment (UE) policies from the PCF. An SM-PCF may register, update, and remove PDU session binding information in the BSF. An AM-PCF may also register with the BSF. However, once the SM-PCF and/or the AM-PCF register(s) with the BSF, there is no mechanism for an application function (AF), a network exposure function (NEF), or other types of network devices to request a particular PCF type, such as the AM-PCF versus the SM-PCF. Given the differentiated services the SM-PCF and the AM-PCF provide, this deficiency may cause sub-optimal core network performance. For example, the AF may need to send policies about UE traffic, which may be identified by a UE address, to the appropriate PCF that has PDU session information. This becomes problematic when there may be multiple PCFs having distinct addresses. The NEF may be subject to similar issues in which to discover the selected PCF.

According to exemplary embodiments, a discovery service is provided. According to an exemplary embodiment, the discovery service allows a network device to discover a type of PCF from a BSF. For example, an AF or a NEF may discover an AM PCF, an SM PCF, or another dedicated type of PCF from the BSF. According to an exemplary embodiment, the discovery service provides that a message (e.g., a query, a request, or other type of communication) may include PCF-type information. For example, the PCF-type information may indicate an AM PCF, an SM PCF, a UE PCF, or another type of PCF of relevance that may be associated with an end device and session. According to other examples, the PCF-type information may indicate a type of policy charging and rules function (PCRF), a type of policy and charging enforcement function (PCEF) or another type of network device that provides a policy and control service.

According to an exemplary embodiment, the discovery service may also provide a message (e.g., a query response, a response, or other type of communication) that is responsive to the request. For example, when the request includes the PCF-type information, the BSF may provide a response, which includes address information and/or an identifier of the PCF type of relevance, to the requesting network device. According to another example, when the request does not include the PCF-type information, the BSF may provide multiple addresses of PCF types that may be associated with an end device to the requesting network device. According to another example, when a request message does not include the PCF-type information, the BSF may provide the address information of the SM-PCF type.

In view of the foregoing, the discovery service may enable network devices to discover address and/or identifier information of PCFs on a PCF-type level for session binding information. The discovery service may improve PDU session management, policy control, access and mobility management, UE route selection, and other end device and/or network-related management operations.

FIG. 1 is a diagram illustrating an exemplary environment 100 in which an exemplary embodiment of the discovery service may be implemented. As illustrated, environment 100 may include an access network 105 and a core network 150. Access network 105 may include access devices 110, and core network 150 may include core devices 155. Environment 100 may further include end devices 199.

The number, type, and arrangement of networks illustrated in environment 100 are exemplary. Additionally, or alternatively, other networks not illustrated in FIG. 1 may be included in environment 100, such as an xHaul network (e.g., a fronthaul network, a mid-haul network, a backhaul network, etc.), an application layer network, or another type of network.

The number, the type, and the arrangement of network devices in access network 105, and core network 150, as illustrated and described, are exemplary. The number of end devices 199 is exemplary. A network device may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the discovery service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), etc.) or a new interface of the network device may be provided in order to support the communication (e.g., transmission and reception of messages, information elements (IE), attribute value pairs (AVPs), objects, parameters, or other form of information) between network devices and the discovery service logic of the network device, as described herein. According to various exemplary implementations, the interface of the network device may be a service-based interface, a reference point-based interface, an Open Radio Access Network (O-RAN) interface, a 5G interface, or some other type of interface.

Access network 105 may include one or multiple networks of one or multiple types and technologies. For example, access network 105 may be implemented to include a next generation RAN (e.g., a 5G-access network (5G-AN) or a 5G-RAN (referred to herein as simply a 5G-RAN)), another type of future generation RAN, a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, and/or another type of RAN (e.g., a legacy Third Generation (3G) RAN, etc.). Access network 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., a legacy Third Generation (3G) RAN, O-RAN Reference Architecture, a virtualized RAN (vRAN), a self-organizing network (SON), etc.). Access network 105 may include a wired network, an optical network, or another type of network that may provide communication with core network 150, for example.

Access network 105 may include different and multiple functional splitting, such as options 1, 2, 3, 4, 5, 6, 7, or 8 that relate to combinations of access network 105 and core network 120 including an EPC network and/or a NG core (NGC) network, or the splitting of the various layers (e.g., physical layer, Media Access Control (MAC) layer, Radio Link Control (RLC) layer, and Packet Data Convergence Protocol (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of services, such as dual connectivity (DC) or higher (e.g., a secondary cell group (SCG) split bearer service, a MCG split bearer, an SCG bearer service, E-UTRA-NR (EN-DC), NR-E-UTRA-DC (NE-DC), NG RAN E-UTRA-NR DC (NGEN-DC), or another type of DC (e.g., multi-radio access technology (RAT) (MR-DC), single-RAT (SR-DC), etc.), carrier aggregation (CA) (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA) (e.g., non-standalone NR, non-standalone E-UTRA, etc.), SA (e.g., standalone NR, standalone E-UTRA, etc.), etc.).

According to various exemplary embodiments, access network 105 may be implemented to include various architectures of wireless service, such as, for example, macrocell, microcell, femtocell, picocell, metrocell, NR cell, LTE cell, non-cell, or another type of architecture. Additionally, according to various exemplary embodiments, access network 105 may be implemented according to various wireless technologies (e.g., RATs, etc.), wireless standards, wireless frequencies/bands/carriers (e.g., centimeter (cm) wave, millimeter (mm) wave, below 6 GHz, above 6 GHz, licensed radio spectrum, unlicensed radio spectrum, NR low band, NR mid-band, NR high band, etc.), and/or other attributes of radio communication.

Depending on the implementation, access network 105 may include one or multiple types of network devices, such as access devices 110. For example, access devices 110 may include a next generation Node B (gNB), an evolved Node B (eNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), a future generation wireless access device, another type of wireless node (e.g., a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. According to some exemplary implementations, access devices 110 may include a combined functionality of multiple RATs (e.g., 4G and 5G functionality).

Core network 150 may include one or multiple networks of one or multiple types and technologies. According to an exemplary embodiment, core network 150 includes a complementary network of access network 105. For example, core network 150 may be implemented to include a 5GC network (also known as next generation core (NGC) network) (or other type of a future generation network), an EPC of an LTE network, an LTE-Advanced (LTE-A) network, and/or an LTE-A Pro network. Core network 150 may include a legacy core network.

Depending on the implementation, core network 150 may include various types of network devices, such as core devices 155. For example, core devices 155 may include a user plane function (UPF), a Non-3GPP Interworking Function (N3IWF), an AMF, an SMF, a unified data management (UDM) device, a unified data repository (UDR) device, an authentication server function (AUSF), a network slice selection function (NSSF), a network repository function (NRF), a PCF, an AM PCF, an SM PCF, a BSF, a network data analytics function (NWDAF), a NEF, a lifecycle management (LCM) device, an AF, a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a PCRF, a PCEF, and/or a charging system (CS). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Core devices 155 may also include a network device that provides a multi-RAT functionality (e.g., 4G and 5G), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Access network 105 and/or core network 150 may include a public network, a private network, and/or an ad hoc network. According to an exemplary embodiment, a portion of core devices 155 may include logic that provides the discovery service, as described herein.

End device 199 may include a device that has computational and wireless communicative capabilities. Depending on the implementation, end device 199 may be a mobile device, a portable device, a stationary device, a device operated by a user (e.g., UE, etc.), or a device not operated by a user (e.g., an Internet of Things (IoT) device, etc.). For example, end device 199 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, or other type of wireless device. End device 199 may be configured to execute various types of software (e.g., applications, programs, etc.). The number and the types of software may vary among end devices 199.

Figure 2:
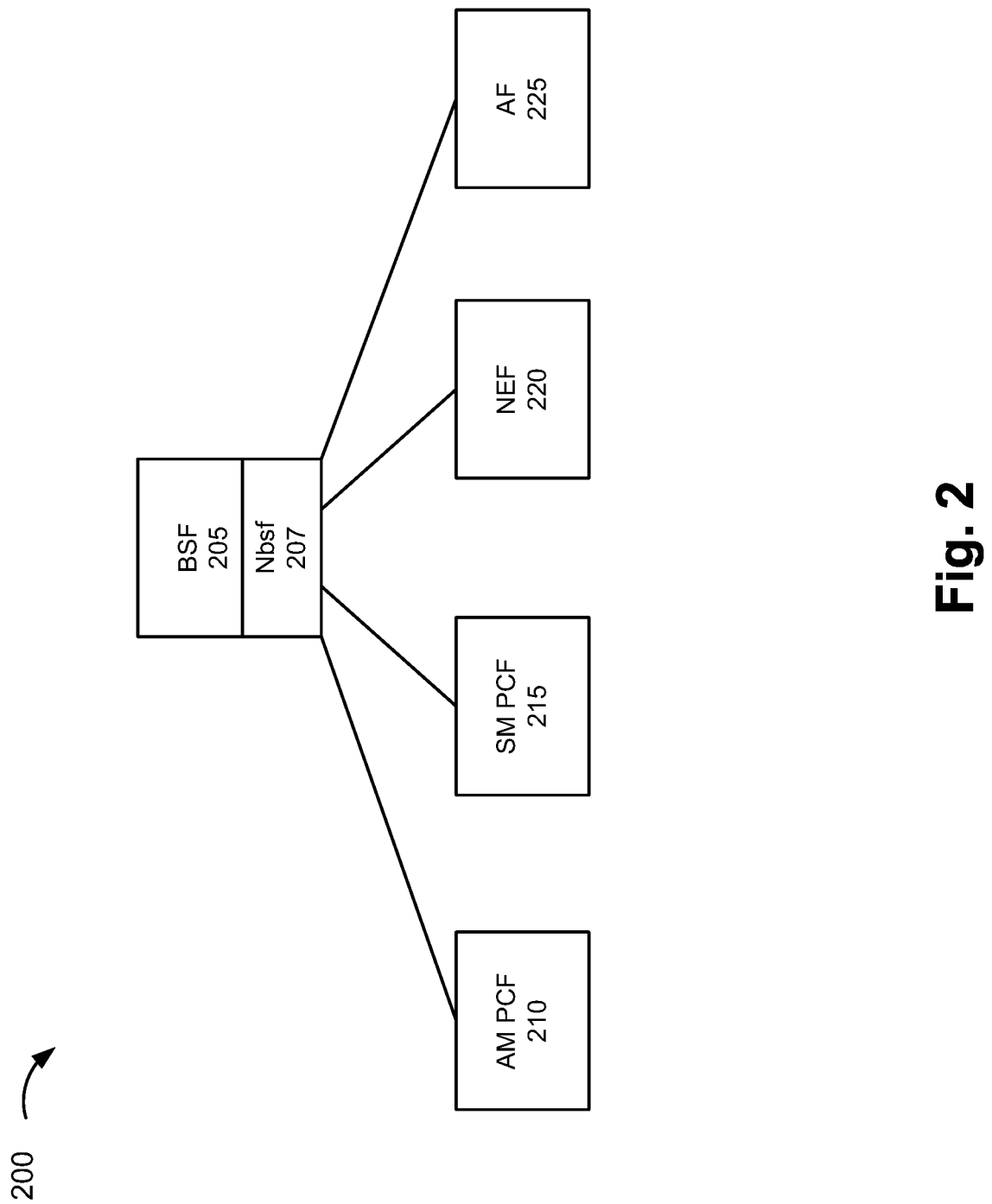
FIG. 2 is a diagram illustrating another exemplary environment in which an exemplary embodiment of the discovery service may be implemented.

FIG. 2 is a diagram illustrating another exemplary environment 200 in which an exemplary embodiment of the discovery service may be implemented. As illustrated, environment 200 may include a BSF 205, an AM PCF 210, an SM PCF 215, a NEF 220, and an AF 225. According to other exemplary embodiments, environment 200 may include additional, different, and/or fewer network devices. For example, according to other exemplary embodiments, there may be additional dedicated PCF types, such as a UE PCF that provides policy control in relation to UE policies (e.g., access network discovery and selection, UE route selection, network slicing, etc.) and/or another dedicated type of PCF. Additionally, or alternatively, in addition to NEF 220 and AF 225, there may be other network devices (e.g., other core devices 155 and/or network devices of a network external from access network 105 and/or core network 150) that may use the discovery service, as described herein.

The number, the type, and the arrangement of network devices in environment 200, as illustrated and described, are exemplary. According to some exemplary embodiments, BSF 205 may be a standalone network device. According to other exemplary embodiments, the functionality of BSF 205 may be provided individually or in combination with other network devices of core network 150 (e.g., a UDR, an SMF, a PCF, an NRF, etc.) (not illustrated).

According to an exemplary embodiment, BSF 205, AM PCF 210, SM PCF 215, NEF 220, and/or AF 225 may each include functions and/or services specified and/or defined by a standards body such as 3GPP, 3GPP2, ITU, ETSI, GSMA, or other types of standards, and/or functions and/or services of a proprietary nature. For example, BSF 205 may include a network device that provides a binding service. The binding service may include a registering service and deregistering service for binding information, and a discovery service that discovers selected policy control network devices, such as selected PCFs.

According to an exemplary embodiment, in contrast to a known discovery service of the standard or proprietary nature of a BSF, the discovery service of BSF 205 includes discovery of types of network devices (e.g., types of policy control network devices, such as different types of PCFs) and other features, as described herein. For the sake of description, BSF 205 may include an Nbsf interface 207 that supports communication between BSF 205 and AM PCF 210, SM PCF 215, NEF 220, and AF 225. According to an exemplary embodiment, Nbsf interface 207 may support a binding service that includes an exemplary embodiment of the discovery service, as described herein. According to other exemplary embodiments, an interface other than an Nbsf interface (e.g., in terms of functionality and/or nomenclature) may be implemented.

AM PCF 210 may include a network device that provides policy control functionalities and information relating to access and mobility management. AM PCF 210 may register, update, and deregister binding information with BSF 205. For example, the binding information may include a network address (e.g., an Internet Protocol (IP) address, a Media Access Control (MAC) address, etc.) of end device 199 and an identifier of AM PCF 210. The binding information may include other types of information, such as a Data Network Name (DNN), a Subscription Permanent Identifier (SUPI), a Generic Public Subscription Identifier (GPSI), Single Network Slice Selection Assistance Information (S-NSSAI), and/or other types of identifiers (e.g., a Globally Unique Temporary Identifier (GUTI), a Permanent Equipment Identifier (PEI), a Subscription Concealed Identifier (SUCI), a PDU session identifier, etc.). AM PCF 210 may register and deregister binding information associated with end device 199 and PDU sessions.

SM PCF 215 may include a network device that provides policy control functionalities and information relating to session management, such as QoS and charging rules, and network slice selection information associated with end device 199. SM PCF 215 may register, update, and deregister binding information with BSF 205. For example, the binding information may include a network address (e.g., an IP address, a MAC address, etc.) of end device 199 and an identifier of SM PCF 215. The binding information may include other types of information, such as a DNN, a SUPI, a GPSI, S-NSSAI, and/or other types of identifiers (e.g., a GUTI, a PEI, a SUCI, etc.). SM PCF 215 may register and deregister binding information associated with end device 199 and PDU sessions.

NEF 220 may include a network device that may expose services, capabilities, and events provided by other network devices, securely provision information from external network devices, and translate internal and external information relative core network 150. NEF 220 may include logic that provides the discovery service, as described herein. For example, NEF 220 may discover the selected PCF of a PCF type, such as AM PCF 210, SM PCF 215, and/or another type of PCF type (not illustrated) based on the discovery service.

AF 225 may include a network device that may support application influence on traffic routing, accessing NEF 220, and interacting with the policy framework for policy control. AF 225 may include logic that provides the discovery service, as described herein. For example, AF 225 may discover the selected PCF of a PCF type, such as AM PCF 210, SM PCF 215, and/or another type of PCF type (not illustrated) based on the discovery service. AF 225 may or may not be a third party network device (e.g., relative to end device 199 and core network provider of core network 150).

Figure 3:
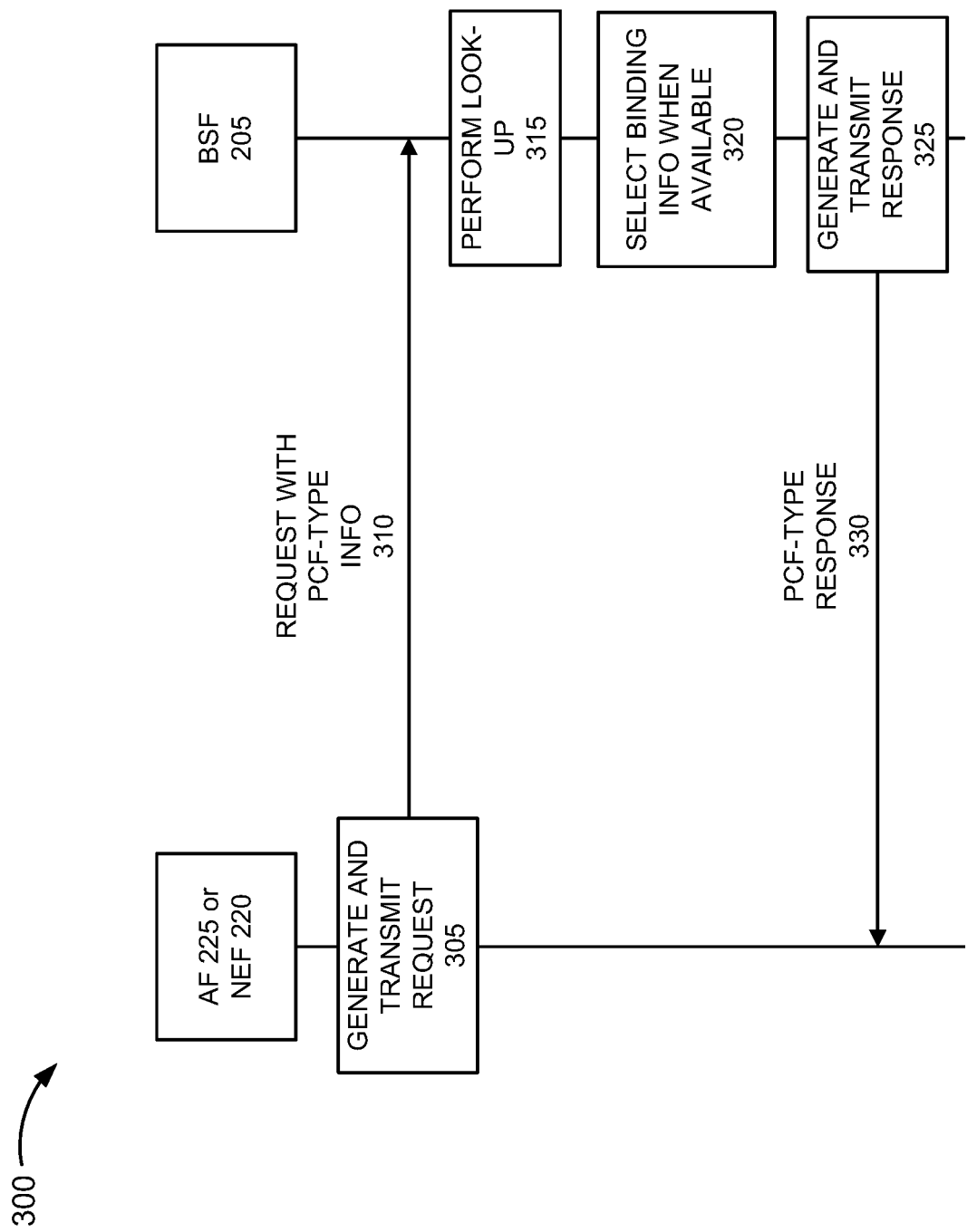
FIG. 3 is a diagram illustrating an exemplary process of an exemplary embodiment of the discovery service.

FIG. 3 is a diagram illustrating an exemplary process 300 of an exemplary embodiment of the discovery service. Referring to FIG. 3, a network device (e.g., NEF 220, AF 225, or another network device) may generate and transmit a request 305 to BSF 205. The generation of the request may be triggered based on an attachment procedure of end device 199, the initiation or establishment of an application session (e.g., a PDU session, etc.), or another type of event.

According to an exemplary embodiment, the request 310 may include PCF-type information. For example, the PCF-type information may indicate an AM PCF, an SM PCF, or another dedicated type of PCF. The request 310 may include other types of query parameters, such as UE address and/or other identifiers, as described herein. According to an exemplary embodiment, the request 310 may be implemented as a Hypertext Transfer Protocol (HTTP) GET message. According to other exemplary embodiments, the request 310 may be implemented according to a protocol different from HTTP.

In response to receiving the request 310, BSF 205 may perform a look-up against binding information 315 based on the request 310. For example, BSF 205 may search binding information based on the query parameters included in the request 310, which includes the PCF-type information. Based on the result of the look-up, BSF 205 may determine whether binding information of relevance exists.

According to an exemplary scenario when binding information matches or satisfies the query parameters, BSF 205 may select binding information 320. For example, the binding information may include an identifier and/or a network address of the PCF type associated with end device 199. BSF 205 may generate and transmit a response 325. For example, the response 330 may include the binding information. According to an exemplary embodiment, the response 330 may be implemented as an HTTP (200) OK message. According to other exemplary embodiments, the response 330 may be implemented according to a protocol different from HTTP.

According to another exemplary scenario when binding information does not match or satisfy the query parameters, BSF 205 may generate and transmit the response 325 that does not include binding information. For example, the response 330 may be an HTTP 404 Not Found message or a similar message of a protocol different from an HTTP. According to either scenario, the response 330 may be transmitted to the requesting network device (e.g., NEF 220, AF 225, etc.).

FIG. 3 illustrates an exemplary process 300 of the discovery service, however, according to other embodiments, process 300 may include additional operations, fewer operations, and/or different operations than those illustrated in FIG. 3 and described herein. For example, for circumstances that a requesting network device does not include the PCF type information in a request, BSF 205 may provide a response that includes all PCF(s) (e.g., AM PCF, SM PCF, etc.) that may be associated with end device 199. According to another exemplary embodiment, when a requesting network device does not include the PCF type information in a request, BSF 205 may provide at least one of the PCF types (e.g., AM PCF or SM PCF), or only one of the PCF types.

Figure 4:
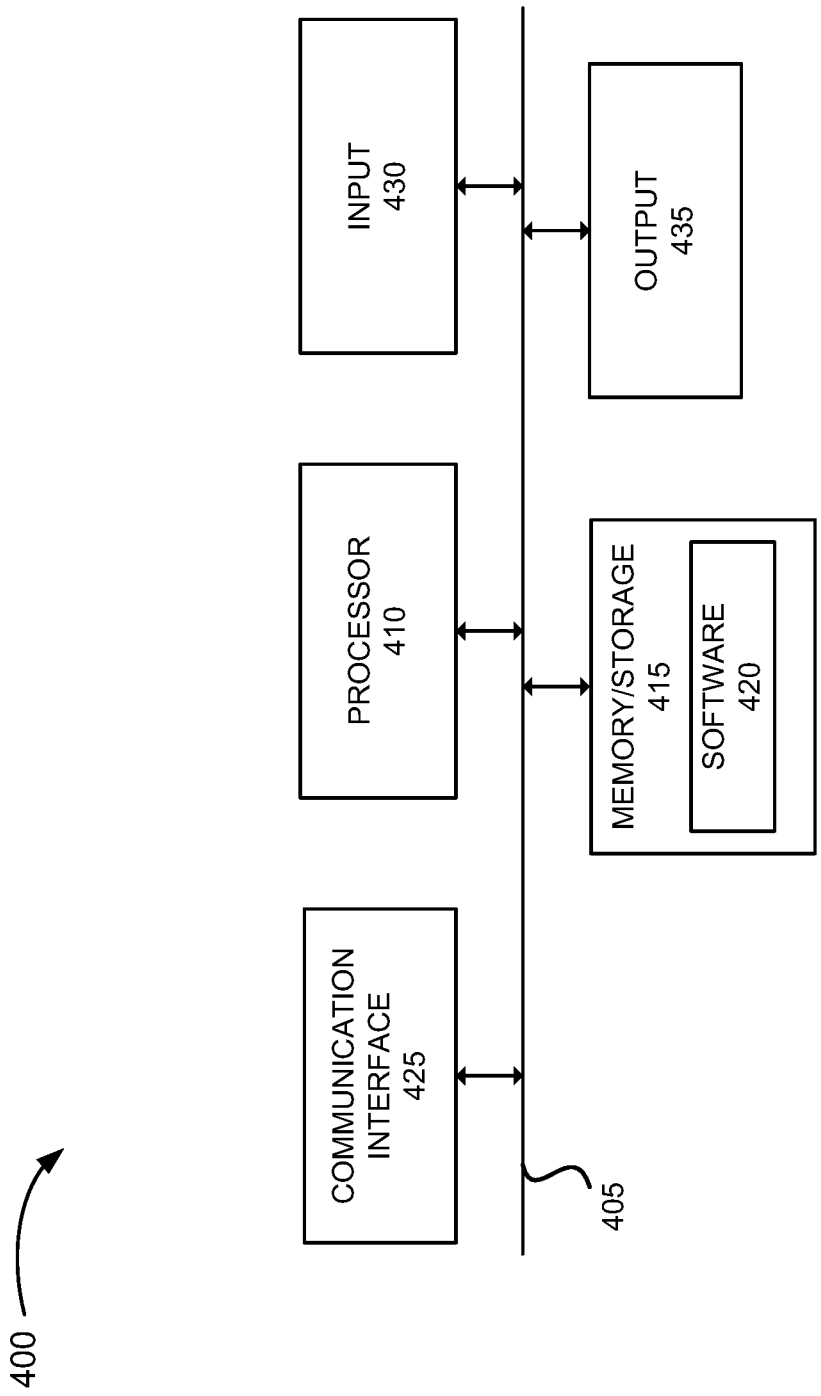
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access devices 110, core devices 155, BSF 205, AM PCF 210, SM PCF 215, NEF 220, AF 225, and other types of network devices or logic, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, software 420 may include an application that, when executed by processor 410, provides a function of the discovery service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, etc., as previously described.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5:
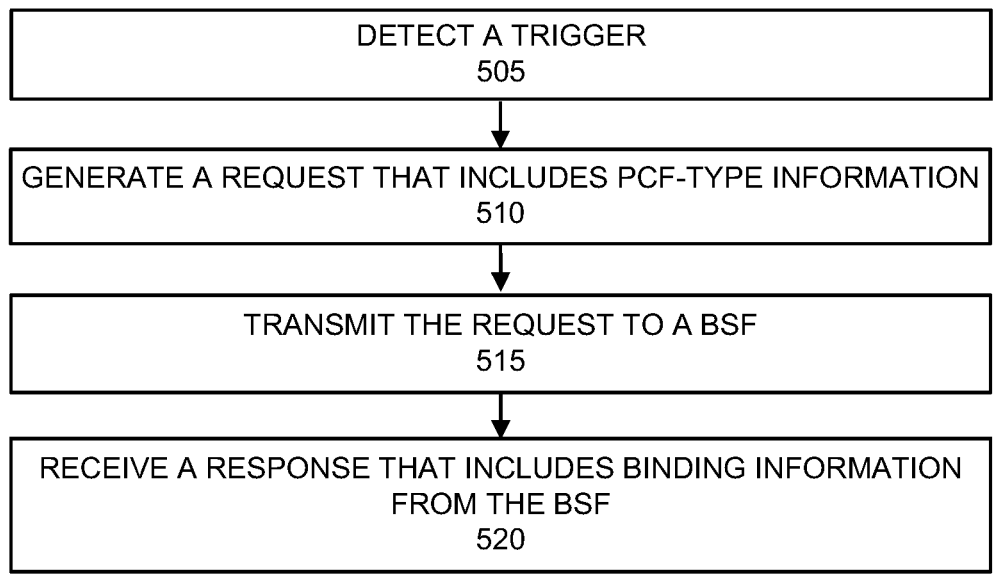
FIG. 5 is a flow diagram illustrating an exemplary process of an exemplary embodiment of the discovery service.

FIG. 5 is a flow diagram illustrating an exemplary process 500 of an exemplary embodiment of the discovery service. According to an exemplary embodiment, a network device may perform steps of process 500. For example, the network device may be a NEF, an AF, or another type of network device of a core network or an external network. According to an exemplary implementation, processor 410 executes software 420 to perform a step illustrated in FIG. 6 and described herein. Alternatively, a step illustrated in FIG. 6 and described herein, may be performed by execution of only hardware.

Referring to FIG. 5, in block 505, the network device may detect a trigger. For example, the network device may detect an initiation of an application session (e.g., a PDU session, a voice call, etc.) associated with end device 199, the performance of an attachment procedure associated with end device 199, or detect some other type of event (e.g., receipt of a communication, detection of a timer, etc.) that may cause the network device to generate a request for binding information.

In block 510, the network device may generate a request, which includes PCF-type information, for binding information. For example, the request may be for PCF session binding information associated with end device 199. The PCF-type information may indicate a type of PCF, such as an AM PCF, an SM PCF, or another dedicated type of PCF or similar dedicated type of policy control device. The network device may generate the request in response to the detection of the trigger. The request may include other query parameters (e.g., network address of end device 199, an identifier (e.g., SUPI, DNN, S-NNSAI, etc.), and/or other type of parameters), as described herein.

In block 515, the network device may transmit the request to a BSF. For example, the network device may transmit the request to BSF 205.

In block 520, the network device may receive a response that includes binding information from the BSF. For example, the response may include an identifier and/or a network address associated with the PCF of the PCF type and end device 199.

FIG. 5 illustrates an exemplary process 500 of the discovery service, however, according to other embodiments, process 500 may include additional operations, fewer operations, and/or different operations than those illustrated in FIG. 5 and described herein. For example, in block 520, the response may include a negative acknowledgement or other type of message indicating that the requested binding information does not exist or is not available.

Figure 6:
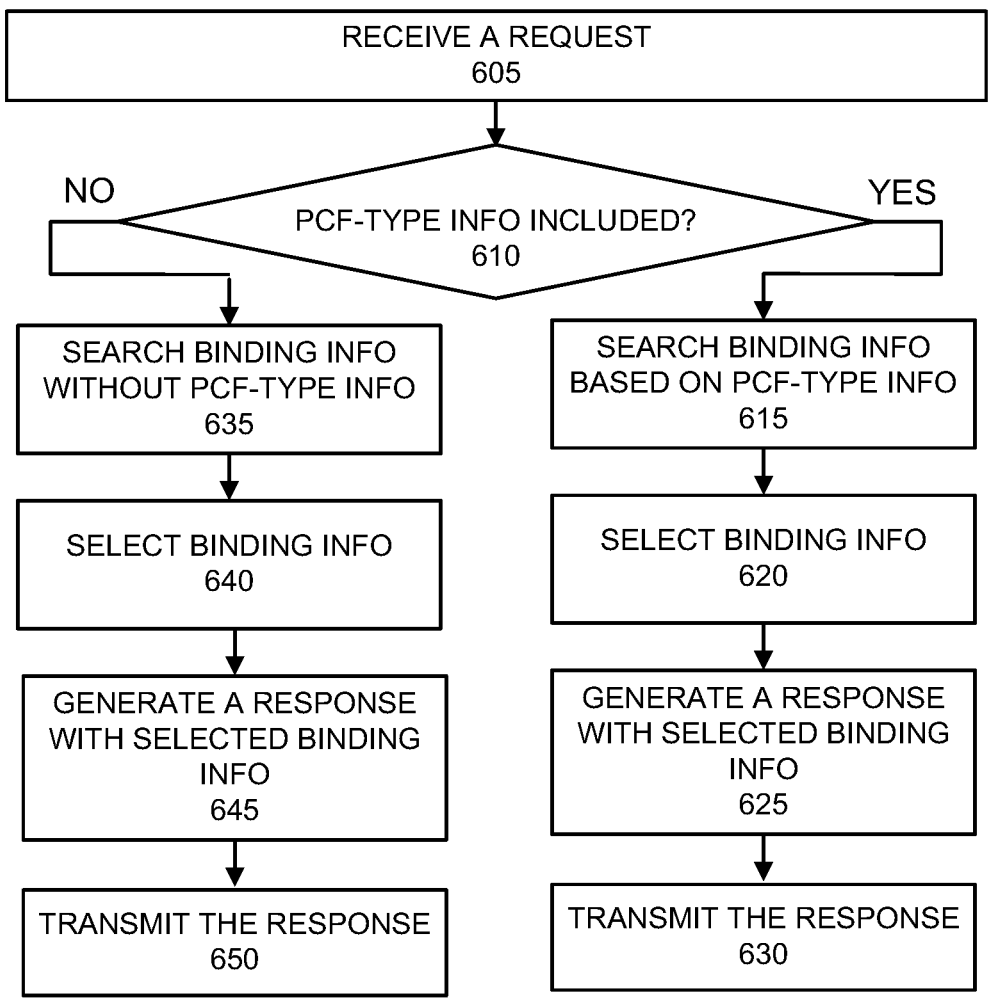
FIG. 6 is a flow diagram illustrating another exemplary process of an exemplary embodiment of the discovery service.

FIG. 6 is a flow diagram illustrating another exemplary process 600 of an exemplary embodiment of the discovery service. According to an exemplary embodiment, a network device may perform steps of process 600. For example, the network device may be BSF 205. According to an exemplary implementation, processor 410 executes software 420 to perform a step illustrated in FIG. 6 and described herein. Alternatively, a step illustrated in FIG. 6 and described herein, may be performed by execution of only hardware. For the sake of description, assume for process 600 that binding information of relevance to the request is available.

In block 605, the network device may receive a request. For example, the request may be for PCF binding information. According to various exemplary scenarios, the request may or may not include PCF-type information. The request may include other query parameters, as described herein.

In block 610, the network device may determine whether the request includes the PCF-type information. For example, the network device may analyze the request to determine whether the request PCF-type information that indicates a dedicated type of PCF.

When it is determined that the request includes PCF-type information (block 610—YES), the network device may search binding information based on the PCF-type information (block 615). For example, the network device may search PCF session binding information based on the PCF-type information. For example, the binding information may include PCF-type information correlated to binding information and end device information (e.g., identifier, network address, etc.). The network device may use other query parameters, as described herein, to search the binding information stored by and/or accessible to BCF 205.

In block 620, the network device may select binding information based on the result of the search. For example, the network device may select an identifier and/or a network address of the type of the PCF that matches or satisfies the query parameters.

In block 625, the network device may generate a response that includes the selected binding information. For example, the network device may generate a response that includes the identifier and/or the network address of the type of the PCF. The response may be implemented as an HTTP message (e.g., 200 OK) or a similar message of another protocol.

In block 630, the network device may transmit the response. For example, the network device may transmit the response to the requesting network device, such as NEF 220, AF 225, or another network device.

When it is determined that the request does not include PCF-type information (block 610—NO), the network device may search binding information without the PCF-type information (block 635). For example, the network device may search PCF session binding information based on the query parameters, which do not include the PCF-type information. For example, the binding information may include binding information and end device information (e.g., identifier, network address, etc.). The network device may use other query parameters, as described herein, to search the binding information stored by and/or accessible to BCF 205.

In block 640, the network device may select binding information based on the result of the search. For example, the network device may select an identifier and/or a network address that matches or satisfies the query parameters included in the request. According to some exemplary embodiments, the network device may select any or all PCF(s) that may be associated with the network address and/or identifier of end device 199. According to other exemplary embodiments, the network device may select at least one of the types of PCFs (e.g., AM PCF, SM PCF, etc.) or only a particular type of PCF (e.g., only AM PCF or only SM PCF).

In block 645, the network device may generate a response that includes the selected binding information. For example, the network device may generate a response that includes the identifier and/or the network address of one or multiple PCFs. The response may be implemented as an HTTP message (e.g., 200 OK) or a similar message of another protocol.

In block 650, the network device may transmit the response. For example, the network device may transmit the response to the requesting network device, such as NEF 220, AF 225, or another network device.

FIG. 6 illustrates an exemplary process 600 of the discovery service, however, according to other embodiments, process 600 may include additional operations, fewer operations, and/or different operations than those illustrated in FIG. 6 and described herein. For example, in blocks 620, 625, 630, 640, 645, and 650, there may be situations when there is no binding information. According to such situations, the response may indicate a negative acknowledgement or similar type of message, as described herein, that may not include any binding information.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. For example, according to other embodiments, different types of network devices other than different types of policy control network devices may register, update, and deregister binding information. As such, a BSF or another type of network device may provide a discover service in relation to the binding information for various types of network devices.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   detecting, by a network device that is an application function (AF) or a network exposure function (NEF), a trigger event;
   generating, by the network device based on the detecting, a request for binding information from a binding service function (BSF) for which the network device does not have a network address of a type of a split policy control network device and single network slice selection assistance information (S-NSSAI);
   transmitting, by the network device to the BSF, the request; and
   receiving, by the network device from the BSF, a response that includes the binding information, wherein the binding information includes network addresses or identifiers of multiple types of split policy control devices including the network address or an identifier of the split policy control network device.

2. The method of claim 1, wherein the multiple types of split policy control devices include an access management policy control function (PCF) and a session management PCF.

3. The method of claim 1, wherein the trigger event is an attachment procedure of an end device.

4. The method of claim 1, wherein the type of the split policy control network device includes a user equipment (UE) policy control function.

5. The method of claim 1, wherein the request further includes at least one of an identifier of an end device or a data network name.

6. The method of claim 1, wherein the trigger event includes an initiation of a packet data unit (PDU) session associated with an end device.

7. The method of claim 1, wherein the request includes a Hypertext Transfer Protocol (HTTP) GET message, and the response includes an HTTP 200 OK message.

8. The method of claim 1, wherein the network device is part of a core network.

9. A network device comprising:
   a processor configured to:
   detect a trigger event, wherein the network device is an application function (AF) or a network exposure function (NEF);
   generate, based on the detection, a request for binding information from a binding service function (BSF) for which the network device does not have a network address of a type of a split policy control network device and single network slice selection assistance information (S-NSSAI);
   transmit, to the BSF, the request; and
   receive, from the BSF, a response that includes the binding information, wherein the binding information includes network addresses or identifiers of multiple types of split policy control devices including the network address or an identifier of the split policy control network device.

10. The network device of claim 9, wherein the multiple types of split policy control devices include an access management policy control function (PCF) and a session management PCF.

11. The network device of claim 9, wherein the trigger event is an attachment procedure of an end device.

12. The network device of claim 9, wherein the type of the split policy control network device includes a user equipment (UE) policy control function.

13. The network device of claim 9, wherein the request further includes at least one of an identifier of an end device or a data network name.

14. The network device of claim 9, wherein the trigger event includes an initiation of a packet data unit (PDU) session associated with an end device.

15. The network device of claim 9, wherein the request includes a Hypertext Transfer Protocol (HTTP) GET message, and the response includes an HTTP 200 OK message.

16. The network device of claim 9, wherein the network device is part of a core network.

17. A non-transitory computer-readable storage medium storing instructions executable by a processor of a network device, which when executed cause the network device to:
   detect a trigger event, wherein the network device is an application function (AF) or a network exposure function (NEF);

generate, based on the detection, a request for binding information from a binding service function (BSF), wherein the request includes a query parameter that indicates a type, among multiple types, of a split policy control network device for which the network device does not have a network address and single network slice selection assistance information (S-NSSAI);

transmit, to the BSF, the request; and receive, from the BSF, a response that includes the binding information, wherein the binding information includes the network address of the split policy control network device of the type.

18. The non-transitory computer-readable storage medium of claim 17, wherein the multiple types of split policy control devices include an access management policy control function (PCF) and a session management PCF.

19. The non-transitory computer-readable storage medium of claim 17, wherein the trigger event is an attachment procedure of an end device.

20. The non-transitory computer-readable storage medium of claim 17, wherein the type of the split policy control network device includes a user equipment (UE) policy control function.

* * * * *